US010208245B2

(12) United States Patent
Goan et al.

(10) Patent No.: US 10,208,245 B2
(45) Date of Patent: Feb. 19, 2019

(54) SEMICONDUCTOR NANOPARTICLE ASSEMBLY AND METHOD FOR MANUFACTURING THE SAME

(71) Applicant: Konica Minolta, Inc., Tokyo (JP)

(72) Inventors: Kazuyoshi Goan, Tokyo (JP); Hidekazu Kawasaki, Tokyo (JP); Yoichi Fujieda, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 279 days.

(21) Appl. No.: 15/313,636

(22) PCT Filed: May 21, 2015

(86) PCT No.: PCT/JP2015/064654
§ 371 (c)(1),
(2) Date: Nov. 23, 2016

(87) PCT Pub. No.: WO2015/190257
PCT Pub. Date: Dec. 17, 2015

(65) Prior Publication Data
US 2017/0210981 A1    Jul. 27, 2017

(30) Foreign Application Priority Data

Jun. 11, 2014   (JP) ................. 2014-120708
Aug. 8, 2014    (JP) ................. 2014-162642

(51) Int. Cl.
*B82Y 20/00*     (2011.01)
*B82Y 30/00*     (2011.01)
(Continued)

(52) U.S. Cl.
CPC ............ *C09K 11/025* (2013.01); *B82Y 30/00* (2013.01); *B82Y 40/00* (2013.01); *C09K 11/02* (2013.01);
(Continued)

(58) Field of Classification Search
CPC ....... C09K 11/025; B82Y 30/00; B82Y 20/00; B82Y 40/00; Y10S 977/774; Y10S 977/95
See application file for complete search history.

(56) References Cited

U.S. PATENT DOCUMENTS

2013/0153837 A1   6/2013  Hoshino et al.
2016/0161065 A1*  6/2016  Sung ................. B32B 27/38
                                          362/84

FOREIGN PATENT DOCUMENTS

EP    2520636       *  11/2012
EP    2520636  A1     11/2012
(Continued)

OTHER PUBLICATIONS

Ma et al, "Highly bright wter-soluble silica coated quantum dots with excellent stability", J. Mat. Chem. B, 2, 2014, pp. 5043-5051.*
(Continued)

Primary Examiner — C Melissa Koslow
(74) Attorney, Agent, or Firm — Lucas & Mercanti, LLP

(57) ABSTRACT

The present invention provides a semiconductor nanoparticle assembly having improved luminous efficiency, heat resistance, and oxidation resistance, and a method for manufacturing the same.
The present invention relates to a semiconductor nanoparticle assembly which includes an aggregate having a plurality of coated semiconductor nanoparticles aggregated, said coated semiconductor nanoparticles each containing a semiconductor nanoparticle having a core/shell structure and a translucent coating layer having a thickness of 3 nm or more and 15 nm or less for coating the semiconductor nanoparticle.

12 Claims, 1 Drawing Sheet

(51) Int. Cl.
  *B82Y 40/00* (2011.01)
  *C09K 11/02* (2006.01)
  *C09K 11/56* (2006.01)
  *C09K 11/88* (2006.01)

(52) U.S. Cl.
  CPC .......... *C09K 11/565* (2013.01); *C09K 11/883* (2013.01); *B82Y 20/00* (2013.01); *Y10S 977/774* (2013.01); *Y10S 977/824* (2013.01); *Y10S 977/892* (2013.01); *Y10S 977/896* (2013.01); *Y10S 977/95* (2013.01)

(56) References Cited

FOREIGN PATENT DOCUMENTS

| JP | 4403270 B2 | 11/2009 |
| JP | 4840823 B2 | 10/2011 |
| JP | 2013057630 A | 3/2013 |
| WO | 2006033732 A1 | 3/2006 |
| WO | 2011081037 A1 | 7/2011 |
| WO | 2012026150 A1 | 3/2012 |

OTHER PUBLICATIONS

Extended European Search Report, 15805790.1, dated Nov. 17, 2017.

Synthesis and Properties of Biocompatible Water-Soluble Silica-Coated CdSe/Zns Semiconductor Quantum Dots, Daniele Gerion et al., J. Phys. Chem. B, vol. 105, No. 37, 2001, p. 8861-8871.

Highly bright water-soluble silica coated quantum dots with excellent stability, Yunfei Ma et al., J. Mater. Chem. B, 2014, 2, p. 5043-5051.

International Search Report dated Aug. 11, 2015 for PCT/JP2015/064654 and English translation.

Official Notification of Reasons for Refusal dated Dec. 11, 2018 from the corresponding Japanese Patent Application No. 2016-527721 and English translation.

* cited by examiner

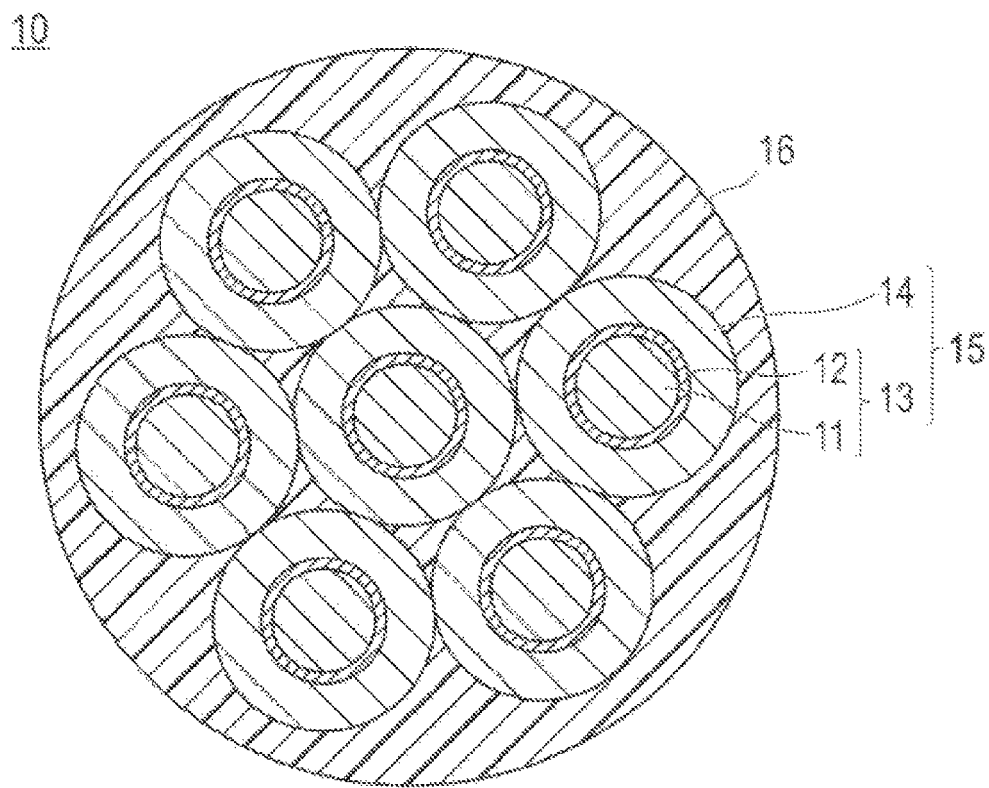

SEMICONDUCTOR NANOPARTICLE ASSEMBLY AND METHOD FOR MANUFACTURING THE SAME

CROSS REFERENCE TO RELATED APPLICATION

This Application is a 371 of PCT/JP2015/064654 filed on May 21, 2015, which, in turn, claimed the priority of Japanese Patent Application No. JP 2014-120708 filed on Jun. 11, 2014 and Japanese Patent Application No. JP 2014-162642 filed on Aug. 8, 2014, all applications are incorporated herein by reference.

TECHNICAL FIELD

The present invention relates to a semiconductor nanoparticle assembly and a method for manufacturing the same.

BACKGROUND ART

In recent years, a high-performance phosphor having high luminous efficiency and brightness and emitting light in a variety of colors has been indispensable for use in a labeling agent in bio-imaging, a display, LED lighting, or the like. In addition, in the display or the lighting, it has been required for a phosphor to have a color rendering property and durability. A conventional phosphor using a rare earth ion or a transition metal ion has been used for a display or the like because of better durability than an organic dye or the like, but does not necessarily have sufficient brightness or color rendering property. A phosphor having higher performance than these phosphors, particularly, a phosphor having high brightness has been demanded.

As a high-performance phosphor to realize these demands, a semiconductor nanoparticle has attracted attention. As a semiconductor nanoparticle to emit fluorescent light, a semiconductor nanoparticle in Group II-VI or Group III-V has been widely known. However, when these semiconductor nanoparticles are used, brightness per particle is not sufficient at present.

On the other hand, in general, brightness of particles formed only of core semiconductor nanoparticles is much lower than semiconductor nanoparticles each having a core/shell structure. By using a semiconductor material having a wider bandgap than a core particle as a shell, a quantum well is formed, and brightness is remarkably improved due to a quantum confinement effect. Therefore, as a method for attaining high brightness, a method for increasing brightness per particle by assembling semiconductor nanoparticles each having a core/shell structure has been considered.

In addition, a technology of confining by dispersing and fixing semiconductor nanoparticles in a matrix such as transparent glass to obtain a solid material exhibiting a high brightness light emission characteristic for a long time under various environments and suitable for an optical application has been also proposed.

Specifically, JP 4403270 B1 and JP 4840823 B1 (corresponding to US 2009/108235 A) disclose a fluorescent glass fine particle having semiconductor nanoparticles dispersed therein by combining a reverse micelle method and a sol-gel method using a precursor of glass. An aggregate using semiconductor nanoparticles and fluorescent enhancement particles together as described in JP 2013-57630 A and an aggregate by controlling aggregation of semiconductor nanoparticles with a physical energy as described in WO 2012/026150 A (corresponding to US 2013/153837 A) have been also known.

SUMMARY OF INVENTION

However, in a case of the glass fine particle described in JP 4403270 B1 and JP 4840823 B1 (corresponding to US 2009/108235A), semiconductor nanoparticles which are aggregated in the glass fine particle are shielded from an external atmosphere, but fluorescence quenching occurs. The glass fine particle cannot obtain sufficient emission intensity disadvantageously.

In addition, the aggregate described in JP 2013-57630 A and WO 2012/026150 A (corresponding to US 2013/153837 A) is intended to be used as a labeling agent in bio imaging. The aggregate does not have sufficient heat resistance or oxidation resistance required in an application for long-term use such as a display or LED lighting, and causes fluorescence quenching. Therefore, the aggregate has insufficient emission intensity disadvantageously.

The present invention has been achieved in view of the above problems. An object thereof is to provide a semiconductor nanoparticle assembly having improved luminous efficiency, heat resistance, and oxidation resistance, and a method for manufacturing the same.

The present inventors have made intensive studies. As a result, the present inventors have found that the above problems can be solved by a semiconductor nanoparticle assembly obtained by aggregating a plurality of coated semiconductor nanoparticles provided with a translucent coating layer having a proper thickness on a semiconductor nanoparticle having a core/shell structure, and have completed the present invention.

That is, the present invention is a semiconductor nanoparticle assembly which comprises an aggregate having a plurality of coated semiconductor nanoparticles aggregated, said coated semiconductor nanoparticles each containing a semiconductor nanoparticle having a core/shell structure and a translucent coating layer having a thickness of 3 nm or more and 15 nm or less for coating the semiconductor nanoparticle aggregated.

BRIEF DESCRIPTION OF DRAWINGS

FIG. 1 is a schematic cross sectional view illustrating a typical structure of a semiconductor nanoparticle assembly according to the present invention. A reference sign 10 indicates a semiconductor nanoparticle assembly, a reference sign 11 indicates a core portion, a reference sign 12 indicates a shell portion, a reference sign 13 indicates a semiconductor nanoparticle, a reference sign 14 indicates a translucent coating layer, a reference sign 15 indicates a coated semiconductor nanoparticle, and a reference sign 16 indicates a matrix.

DESCRIPTION OF EMBODIMENTS

Hereinafter, a semiconductor nanoparticle assembly according to an embodiment of the present invention will be described. The semiconductor nanoparticle assembly according to the present embodiment includes an aggregate having a plurality of coated semiconductor nanoparticles aggregated, wherein the aggregate comprises a semiconductor nanoparticle with a core/shell structure and a translucent coating layer with a thickness of 3 nm or more and 15 nm or less for coating the semiconductor nanoparticle. By having such a constitution, the semiconductor nanoparticle assembly according to the present embodiment has improved luminous efficiency, heat resistance, and oxidation resistance.

Although a detailed reason why the above effect can be obtained by the semiconductor nanoparticle assembly according to the present embodiment is unknown, the following mechanism is considered. To be specific, by the translucent coating layer of the coated semiconductor nanoparticle, heat resistance and oxidation resistance of a semiconductor nanoparticle having a core/shell structure are improved. In addition, by including an aggregate obtained by aggregating coated semiconductor nanoparticles each having a translucent coating layer with a proper thickness, the semiconductor nanoparticle assembly according to the present embodiment prevents occurrence of fluorescence quenching and reduction of luminous efficiency caused by an insufficient distance between the coated semiconductor nanoparticles due to a too thin translucent coating layer, as well as prevents deterioration of a light extraction property from the semiconductor nanoparticle and reduction of luminous efficiency caused by occurrence of light absorption of the translucent coating layer itself or the like due to a too thick translucent coating layer. The semiconductor nanoparticle assembly has improved durability such as heat resistance or oxidation resistance, and also has improved luminous efficiency.

The above mechanism is based on estimation, and the present invention does not adhere to the above mechanism in any way.

Hereinafter, preferable embodiments of the present invention will be described in detail. The present invention is not limited only to the following embodiments.

As used herein, "X to Y" indicating a range means "X or more and Y or less". Unless otherwise specified, operations and measurement of physical properties and the like are performed under conditions of room temperature (20 to 25° C.)/relative humidity 40 to 50% RH.

[Overall Structure of Semiconductor Nanoparticle Assembly]

First, an overall structure of the semiconductor nanoparticle assembly according to the present embodiment will be described.

FIG. 1 is a schematic cross sectional view illustrating a typical structure of the semiconductor nanoparticle assembly according to the present embodiment. A semiconductor nanoparticle assembly 10 contains an aggregate having a plurality of coated semiconductor nanoparticles 15 aggregated, wherein the coated semiconductor nanoparticles 15 each comprises a semiconductor nanoparticle 13 containing a core portion 11 and a shell portion 12, and a translucent coating layer 14 coated on the semiconductor nanoparticle 13. The semiconductor nanoparticle assembly 10 illustrated in FIG. 1 contains a matrix 16 in order to strengthen aggregation between the coated semiconductor nanoparticles 15, but the matrix 16 can be omitted.

[Semiconductor Nanoparticle]

As used herein, the semiconductor nanoparticle means a particle formed of a crystal of a semiconductor material and having a predetermined size so as to attain a quantum confinement effect. The semiconductor nanoparticle is a fine particle having a particle size of about several nm to several tens nm, more specifically, having an average volume particle size of 1 nm to 20 nm, more preferably of 1 nm to 10 nm, and exhibiting the following quantum dot effect.

An energy level E of such a semiconductor nanoparticle is generally represented by the following formula (1) wherein "h" represents a Planck's constant, "m" represents an effective mass of an electron, and "R" represents a radius of a semiconductor nanoparticle.

[Numerical formula 1]

$$E \propto h^2/mR^2 \qquad \text{formula (1)}$$

As indicated by the above formula (1), a band gap of a semiconductor nanoparticle increases in proportion to "$R^{-2}$", and a so-called quantum dot effect is obtained. Thus, by controlling and defining a particle size of a semiconductor nanoparticle, a band gap value of a semiconductor nanoparticle can be controlled. That is, by controlling and defining a particle size of a fine particle, diversity which a normal atom does not have can be imparted. Therefore, excitation by light or emission of light after the light is converted into light having a desired wavelength can be attained. As used herein, such a light emitting semiconductor nanoparticle material is defined as a semiconductor nanoparticle.

A semiconductor nanoparticle used in the present embodiment has a core/shell structure. By having a core/shell structure, a quantum well is formed, and brightness is improved due to a quantum confinement effect.

As used herein, the semiconductor nanoparticle having a core/shell structure is also simply referred to as a "core/shell semiconductor nanoparticle". As used herein, in notation of the semiconductor nanoparticle having a core/shell structure, for example, when the core portion is CdSe and the shell portion is ZnS, the semiconductor nanoparticle may be expressed by "CdSe/ZnS". Such a core/shell semiconductor nanoparticle may be referred to as "CdSe/ZnS core/shell semiconductor nanoparticle".

[Material of Forming Semiconductor Nanoparticle]

As a material which forms the core portion of the core/shell semiconductor nanoparticle, the following materials can be used. Examples thereof include an elemental substance of a Group 14 element in a long-form periodic table, such as carbon, silicon, germanium, and tin; an elemental substance of a Group 15 element in a long-form periodic table, such as phosphorus (black phosphorus); an elemental substance of a Group 16 element in a long-form periodic table, such as selenium and tellurium; a compound formed of a plurality of Group 14 elements in a long-form periodic table, such as silicon carbide (SiC); a compound formed of a Group 14 element in a long-form periodic table and a Group 16 element in a long-form periodic table, such as tin oxide (IV) ($SnO_2$), tin sulfide(II, IV) ($Sn(II)Sn(IV)S_3$), tin sulfide (IV) ($SnS_2$), tin sulfide(II) (SnS), tin selenide(II) (SnSe), tin telluride(II) (SnTe), lead sulfide(II) (PbS), lead selenide(II) (PbSe), or lead telluride(II) (PbTe); a compound formed of a Group 13 element in a long-form periodic table and a Group 15 element in aperiodic table (or a III-V Group compound semiconductor), such as boron nitride (BN), boron phosphide (BP), boron arsenide (BAs), aluminum nitride (AlN), aluminum phosphide (AlP), aluminum arsenide (AlAs), aluminum antimonide (AlSb), gallium nitride (GaN), gallium phosphide (GaP), gallium arsenide (GaAs), gallium antimonide (GaSb), indium nitride (InN), indium phosphide (InP), indium arsenide (InAs), and indium antimonide (InSb); a compound formed of a Group 13 element in a long-form periodic table and a Group 16 element in a long-form periodic table, such as aluminum sulfide ($Al_2S_3$), aluminum selenide ($Al_2Se_3$), gallium sulfide ($Ga_2S_3$), gallium selenide ($Ga_2Se_3$), gallium telluride ($Ga_2Te_3$), indium oxide ($In_2O_3$), indium sulfide ($In_2S_3$), indium selenide ($In_2Se_3$), or indium telluride ($In_2Te_3$); a compound formed of a Group 13 element in a long-form periodic table and a Group 17 element in a long-form periodic table, such as thallium chloride(I) (TlCl), thallium bromide(I) (TlBr), and thallium iodide(I) (TlI); a compound formed of a Group 12 element in a long-form periodic table and a Group 16 element in a long-form periodic table (or a Group II-VI compound semiconductor), such as zinc oxide (ZnO), zinc sulfide (ZnS), zinc selenide (ZnSe), zinc telluride (ZnTe), cadmium oxide (CdO), cadmium sulfide (CdS), cadmium selenide (CdSe), cadmium telluride (CdTe), mercury sulfide (HgS), mercury selenide (HgSe), and mercury telluride (HgTe); a compound formed of a Group 15 element in a long-form periodic table and a Group 16 element in a long-form periodic table, such as arsenic sulfide(III) ($As_2S_3$), arsenic selenide (III) ($As_2Se_3$), arsenic telluride (III) ($As_2Te_3$), antimony sulfide (III) ($Sb_2S_3$), antimony selenide(III) ($Sb_2Se_3$), antimony telluride(III) ($Sb_2Te_3$), bismuth sulfide(III) ($Bi_2S_3$), bismuth selenide(III) ($Bi_2Se_3$), and bismuth telluride (III) ($Bi_2Te_3$); a compound formed of a Group 11 element in a long-form periodic table and a Group 16 element in a long-form periodic table, such as copper oxide (I) ($Cu_2O$) and copper selenide (I) ($Cu_2Se$); a compound formed of a Group 11 element in a long-form periodic table and a Group 17 element in a long-form periodic table, such as copper chloride(I) (CuCl), copper bromide(I) (CuBr), copper iodide(I) (CuI), silver chloride (AgCl), and silver bromide (AgBr); a compound formed of a Group 10 element in a long-form periodic table and a Group 16 element in a long-form periodic table, such as nickel oxide(II) (NiO); a compound formed of a Group 9 element in a long-form periodic table and a Group 16 element in a long-form periodic table, such as cobalt oxide (II) (CoO) or cobalt sulfide(II) (CoS); a compound formed of a Group 8 element in a long-form periodic table and a Group 16 element in a long-form periodic table, such as triiron tetraoxide ($Fe_3O_4$) and iron sulfide(II) (FeS); a compound formed of a Group 7 element in a long-form periodic table and a Group 16 element in a long-form periodic table, such as manganese oxide(II) (MnO); a compound formed of a Group 6 element in a long-form periodic table and a Group 16 element in a long-form periodic table, such as molybdenum sulfide(IV) ($MoS_2$) and tungsten oxide (IV) ($WO_2$); a compound formed of a Group 5 element in a long-form periodic table and a Group 16 element in a long-form periodic table, such as vanadium oxide(II) (VO), vanadium oxide(IV) ($VO_2$), and tantalum oxide(V) ($Ta_2O_5$); a compound formed of a Group 4 element in a long-form periodic table and a Group 16 element in a long-form periodic table, such as titanium oxide ($TiO_2$, $Ti_2O_5$, $Ti_2O_3$, $Ti_5O_9$, or the like); a compound formed of a Group 2 element in a long-form periodic table and a Group 16 element in a long-form periodic table, such as magnesium sulfide (MgS) and magnesium selenide (MgSe); a chalcogen spinel such as cadmium oxide(II) chromium(III) ($CdCr_2O_4$), cadmium selenide(II) chromium(III) ($CdCr_2Se_4$), copper sulfide(II) chromium(III) ($CuCr_2S_4$), and mercury selenide(II) chromium(III) ($HgCr_2Se_4$); and barium titanate ($BaTiO_3$). These materials for forming the core portion may be used singly or in combination of two or more kinds thereof.

Among these materials, preferred are a compound formed of a Group 14 element in a long-form periodic table and a Group 16 element in a long-form periodic table, such as $SnS_2$, SnS, SnSe, SnTe, PbS, PbSe, and PbTe; a III-V Group compound semiconductor such as GaN, GaP, GaAs, GaSb, InN, InP, InAs, and InSb; a compound formed of a Group 13 element in a long-form periodic table and a Group 16 element in a long-form periodic table, such as $Ga_2O_3$, $Ga_2S_3$, $Ga_2Se_3$, $Ga_2Te_3$, $In_2O_3$, $In_2S_3$, $In_2Se_3$, or $In_2Te_3$; a II-VI Group compound semiconductor such as ZnO, ZnS, ZnSe, ZnTe, CdO, CdS, CdSe, CdTe, HgO, HgS, HgSe, and HgTe; a compound formed of a Group 15 element in a long-form periodic table and a Group 16 element in a long-form periodic table, such as $As_2O_3$, $As_2S_3$, $As_2Se_3$, $As_2Te_3$, $Sb_2O_3$, $Sb_2S_3$, $Sb_2Se_3$, $Sb_2Te_3$, $Bi_2O_3$, $Bi_2S_3$, $Bi_2Se_3$, and $Bi_2Te_3$; and a compound formed of a Group 2 element in a long-form periodic table and a Group 16 element in a long-form periodic table, such as MgS and MgSe. More preferred are Si, Ge, GaN, GaP, InN, InP, $Ga_2O_3$, $Ga_2S_3$, $In_2O_3$, $In_2S_3$, ZnO, ZnS, ZnSe, CdO, CdS, and CdSe. These materials do not contain a highly toxic negative element, and therefore have excellent environmental pollution resistance and biological safety. Among these materials, InP, CdSe, ZnSe, and CdS are particularly preferable in view of stability of light emission.

As the shell portion, any material acting as a protective film for the core portion can be used without any particular restriction. The shell portion preferably contains a semiconductor having a larger band gap (forbidden band width) than that of the core portion. By using such a semiconductor in the shell portion, an energy barrier is formed on a semiconductor nanoparticle, and excellent light emitting performance can be attained.

A semiconductor material preferably used in the shell depends on a band gap of a core used. For example, a semiconductor formed of one or more semiconductors selected from the group consisting of ZnO, ZnS, ZnSe, ZnTe, CdO, CdS, CdSe, CdTe, MgS, MgSe, GaAs, GaN, GaP, GaAs, GaSb, HgO, HgS, HgSe, HgTe, InAs, InN, InP, InSb, AlAs, AlN, AlP, and AlSb, or an alloy thereof or a mixed crystal thereof are preferably used. Among these materials for the shell portion, ZnS, ZnSe, ZnTe, and CdSe are preferable from a viewpoint of improvement of brightness.

The shell portion does not have to completely coat an entire surface of the core portion as long as an adverse effect due to partial exposure of the core portion does not occur, but the shell portion only needs to coat at least a part of the core portion. The core/shell structure is preferably formed of at least two compounds. Two or more compounds may form a gradient structure.

A thickness of the shell portion is not particularly limited, but is preferably from 0.1 to 10 nm, and more preferably from 0.1 to 5 nm.

In general, an emission color can be controlled by an average particle size of a semiconductor nanoparticle. When the thickness of the shell portion is within the above range, the thickness of the shell portion is from a thickness equivalent to a few atoms to a thickness less than one semiconductor nanoparticle, the semiconductor nanoparticles can be packed at a high density, and a sufficient amount of light emission can be obtained. In addition, presence of the shell portion can suppress a defect present on a particle surface of each the core particles and transition of non-light emitting electron energy due to electron trap into a dangling bond, and can suppress reduction of quantum efficiency.

As a method for measuring an average particle size (diameter) of a core/shell semiconductor nanoparticle, a known method can be used. Examples thereof include a method for determining the average particle size as a number average particle size of a particle size distribution by performing particle observation of a semiconductor nanoparticle with a transmission electron microscope (TEM), a method for determining the average particle size as an average volume particle size calculated by taking an average value of particle sizes in terms of volume by observing a predetermined number of semiconductor nanoparticles extracted randomly with a TEM, a method for determining the average particle size with an electron force microscope (AFM), a method for measuring the average particle size with a particle size measuring apparatus by a dynamic light scattering method (for example, ZETASIZERNano Series Nano-ZS manufactured by Malvern Co.), and a method for deriving a particle size distribution using a particle size distribution simulation calculation of a semiconductor nanoparticle from a spectrum obtained by an X-ray small angle scattering method. As used herein, the average particle size is represented by an average volume particle size calculated by taking an average value of particle sizes in terms of volume by observing a predetermined number of semiconductor nanoparticles extracted randomly with a TEM. Specifically, an average volume particle size of a core/shell semiconductor nanoparticle used in the present embodiment is preferably from 1 to 20 nm, and more preferably from 1 to 10 nm.

The above materials for forming the semiconductor nanoparticle can be doped with a small amount of various elements as impurities, if necessary. A light emission characteristic can be further improved by addition of such a dope substance.

[Method for Manufacturing Core/Shell Semiconductor Nanoparticle]

As a method for manufacturing a core/shell semiconductor nanoparticle, any known method which has been conventionally performed, such as a liquid phase method and a gas phase, can be used.

Examples of the manufacturing method by the liquid phase method include a co-precipitation method, a sol-gel method, a uniform precipitation method, and a reduction method, which are a precipitation method. In addition, a reverse micelle method, a supercritical hydrothermal synthesis method, a hot soap method, or the like is also an excellent method in terms of manufacturing a nanoparticle (for example, refer to JP 2002-322468 A, JP 2005-239775 A, JP H10-310770 A, and JP 2000-104058 A).

Examples of the manufacturing method by the gas phase method include a method which comprises evaporating an opposing raw material semiconductor by a first high-temperature plasma generated between electrodes and passing the evaporated raw material semiconductor through a second high-temperature plasma generated by electrodeless discharge in a reduced pressure atmosphere (for example, refer to JP H06-279015 A), a method which comprises separating and removing a nanoparticle from an anode formed of a raw material semiconductor by electrochemical etching, (for example, refer to JP 2003-515459 T), and a laser ablation method (for example, refer to JP 2004-356163 A). In addition, a method which comprises synthesizing a powder containing a particle by gas phase reaction of a raw material gas at a low pressure is also preferably used.

As the method for manufacturing a core/shell semiconductor nanoparticle, the manufacturing method by the liquid phase method is preferable.

The core/shell semiconductor nanoparticle used in the present embodiment may contain another component such as a stabilizer, a surfactant, or a solvent usable in synthesis process as long as the core/shell semiconductor nanoparticle does not impair a function as a phosphor.

[Translucent Coating Layer]

The semiconductor nanoparticle assembly according to the present embodiment comprises a translucent coating layer having a thickness of 3 nm or more and 15 nm or less on a surface of a core/shell semiconductor nanoparticle. By including the translucent coating layer, a function of protecting the core/shell semiconductor nanoparticle from oxygen present outside is further improved. As used herein, the core/shell semiconductor nanoparticle including a translucent coating layer is also simply referred to as a coated semiconductor nanoparticle.

The thickness of the translucent coating layer is 3 nm or more and 15 nm or less. When the thickness of the translucent coating layer is less than 3 nm, a distance between the core/shell semiconductor nanoparticles cannot be taken sufficiently. Therefore, fluorescence quenching occurs, decrease luminous efficiency. On the other hand, when the distance is more than 15 nm, light absorption or the like of the translucent coating layer itself occurs, to decrease luminous efficiency. The thickness is preferably 4 nm or more and 12 nm or less. The thickness of the translucent coating layer can be controlled by an addition amount of a material for forming the translucent coating layer with respect to the semiconductor nanoparticle, a reaction time in forming the translucent coating layer, a concentration of a semiconductor nanoparticle in a reaction solution, and the like. Specifically, the thickness of the translucent coating layer can be measured by observation with a transmission electron microscope (TEM) image as described in Examples below.

The translucent coating layer preferably contains silicon. By incorporating silicon, a glassy layer is easily obtained, and heat resistance and oxidation resistance of the semiconductor nanoparticle assembly are further improved.

Specific examples of a material used for forming such a translucent coating layer include a silicon compound such as perhydropolysilazane, organopolysilazane, silsesquioxane, tetramethylsilane, trimethoxysilane, triethoxysilane, trimethylmethoxysilane, dimethyldimethoxysilane, methyltrimethoxysilane, trimethylethoxysilane, dimethyldiethoxysilane, methyl triethoxysilane, tetramethoxysilane, tetraethoxysilane, hexamethyldisiloxane, hexamethyldisilazane, 1,1-dimethyl-1-silacyclobutane, trimethyl vinyl silane, methoxy dimethyl vinyl silane, trimethoxy vinyl silane, ethyl trimethoxysilane, dimethyl divinyl silane, dimethyl ethoxy ethynyl silane, diacetoxy dimethyl silane, dimethoxymethyl-3,3,3-trifluoropropyl silane, 3,3,3-trifluoropropyl trimethoxysilane, aryl trimethoxysilane, ethoxy dimethyl vinyl silane, arylamino trimethoxysilane, N-methyl-N-trimethylsilyl acetamide, 3-aminopropyl trimethoxysilane, methyl trivinyl silane, diacetoxymethyl vinyl silane, methyl triacetoxy silane, aryloxy dimethyl vinyl silane, diethyl vinyl silane, butyl trimethoxy silane, 3-aminopropyl dimethylethoxysilane, tetravinylsilane, triacetoxy vinyl silane, tetraacetoxysilane, 3-trifluoroacetoxy propyl trimethoxysilane, diaryl dimethoxy silane, butyl dimethoxy vinyl silane, trimethyl-3-vinylthiopropyl silane, phenyl trimethyl silane, dimethoxy methyl phenyl silane, phenyl trimethoxysilane, 3-acryloxypropyl dimethoxymethyl silane, 3-acryloxypropyl trimethoxy silane, dimethyl isopentyloxy vinyl silane, 2-aryloxy ethyl thiomethoxy trimethylsilane, 3-glycidoxypropyl trimethoxysilane, 3-arylamino propyl trimethoxysilane, hexyl trimethoxysilane, heptadecafluorodecyl trimethoxysilane, dimethyl ethoxy phenyl silane, benzoyloxy trimethyl silane, 3-methacryloxypropyl dimethoxymethyl silane, 3-methacryloxypropyltrimethoxysilane, 3-isocyanate propyl triethoxy silane, dimethyl ethoxy-3-glycidoxypropyl silane, dibutoxy dimethylsilane, 3-butylaminopropyl trimethyl silane, 3-dimethylaminopropyl diethoxy methyl silane, 2-(2-aminoethyl thioethyl) triethoxy silane, bis(butylamino)dimethyl silane, divinyl methyl phenyl silane, diacetoxy methylphenylsilane, dimethyl-p-tolyl vinyl silane, p-styryltrimethoxysilane, diethyl methyl phenyl silane, benzyl dimethyl ethoxy silane, diethoxy methyl phenyl silane, decyl methyl dimethoxy silane, diethoxy-3-glycidoxypropyl methyl silane, octyloxy trimethyl silane, phenyl trivinyl silane, tetraaryloxy silane, dodecyl trimethyl silane, diarylmethyl phenyl silane, diphenyl methyl vinyl silane, diphenyl ethoxymethyl silane, diacetoxy diphenyl silane, dibenzyldimethyl silane, diaryl diphenyl silane, octadecyl trimethyl silane, methyl octadecyl dimethyl silane, dococyl methyl dimethyl silane, 1,3-divinyl-1,1,3,3-tetramethyldisiloxane, 1,3-divinyl-1,1,3,3-tetramethyldisilazane, 1,4-bis (dimethyl vinyl silyl) benzene, 1,3-bis(3-acetoxypropyl) tetramethyldisiloxane, 1,3,5-trimethyl-1,3,5-trivinylcyclotrisiloxane, 1,3,5-tris(3,3,3-trifluoropropyl)-1,3,5-trimethylcyclotrisiloxane, octamethylcyclotetrasiloxane, 1,3,5, 7-tetraethoxy-1,3,5,7-tetramethyl cyclotetrasiloxane, and decamethylcyclopentasiloxane. These materials can be used singly or in combination of two or more kinds thereof.

Among these materials, perhydropolysilazane (PHPS) and organopolysilazanes (hereinafter, also simply referred to as polysilazane), tetraethoxysilane (TEOS), and hexamethyl disilazane (HMDS) are preferable from viewpoints of high translucency and easy control of reaction.

Polysilazane is a polymer compound having a silazane bond, and means a polymer compound having a Si—N bond in a molecule thereof. Specifically, polysilazane has a bond such as Si—N, Si—H, or N—H in a structure thereof, and is a ceramic precursor inorganic polymer such as $SiO_2$, $Si_3N_4$, and $SiO_xN_y$ which is an intermediate solid solution thereof.

A usable polysilazane is not particularly limited. However, for example, a compound having a main skeleton formed of a unit represented by the following general formula (I) is preferable.

[Chemical formula 1]

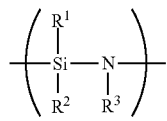

general formula (I)

In the above general formula (I), $R^1$, $R^2$, and $R^3$ each independently represent a hydrogen atom, an alkyl group, an alkenyl group, a cycloalkyl group, an aryl group, an alkylsilyl group, an alkylamino group, or an alkoxy group.

Polysilazane is more preferably perhydropolysilazane (hereinafter, also simply referred to as PHPS) in which $R^1$, $R^2$, and $R^3$ are all a hydrogen atom.

Perhydropolysilazane is estimated to have a structure in which a linear structure and a ring structure mainly containing a 6-membered ring and a 8-membered ring are present. A number average molecular weight (Mn) thereof is about 600 to 2000 (in terms of polystyrene). Perhydropolysilazane can be a liquid or solid material according to its molecular weight. A synthetic product or a commercially available product may be used as perhydropolysilazane.

Other examples of polysilazane include silicon alkoxide addition polysilazane obtained by reaction between polysilazane represented by the above general formula (I) and silicon alkoxide (for example, JP H05-238827 A), glycidol addition polysilazane obtained by reaction between the polysilazane and glycidol (for example, JP H06-122852 A), alcohol addition polysilazane obtained by reaction between the polysilazane and alcohol (for example, JP H06-240208 A), metal carboxylate addition polysilazane obtained by reaction between the polysilazane and a metal carboxylate (for example, JP H06-299118 A), acetylacetonato complex addition polysilazane obtained by reaction between the polysilazane and an acetylacetonato complex containing a metal (for example, JP H06-306329 A), and metal fine particle addition polysilazane obtained by adding a metal fine particle (for example, JP H07-196986 A).

The above polysilazane can be used as a material for the translucent coating layer as it is, but the polysilazane is preferably modified as follows. The modification means a reaction to convert a part or the whole of the polysilazane into silicon oxide, silicon nitride, silicon oxynitride, or the like. The modification is performed, for example, by at least one of heat treatment, ultraviolet ray irradiation treatment, and plasma treatment. By performing the modification, glass property of the translucent coating layer is further increased, and heat resistance and oxidation resistance of the semiconductor nanoparticle assembly are further improved. Modification conditions will be described in detail below.

[Method for Forming Translucent Coating Layer]

A method for forming a translucent coating layer is not particularly limited. For example, a translucent coating layer can be formed by reaction between a core/shell semiconductor nanoparticle and a material for forming a translucent resin layer in a solvent preferably at a temperature of 20 to 80° C. preferably for 10 to 40 hours. When a polymer compound having a silazane bond (polysilazane) is used as the material for forming a translucent coating layer, a translucent coating layer can be formed by forming a coating layer on a core/shell semiconductor nanoparticle using a polymer compound having a silazane bond (polysilazane), and further modifying the coating layer.

Examples of the solvent which can be used include water, a hydrocarbon solvent such as aliphatic hydrocarbon, alicyclic hydrocarbon, aromatic hydrocarbon, and halogenated hydrocarbon; and an ether solvent such as aliphatic ether and alicyclic ether. More specifically, examples of the hydrocarbon solvent include pentane, hexane, cyclohexane, toluene, xylene, Solvesso, terpene, methylene chloride, and trichloroethane. Examples of the ether solvent include dibutyl ether, dioxane, and tetrahydrofuran. These solvents can be used singly or in combination of two or more kinds thereof.

A surfactant such as polyoxyethylene nonyl ethyl ether, a catalyst for hydrolyzing a material for forming a translucent coating layer, such as ammonia, or the like may be further added to a reaction system, if necessary.

A use amount of the material for forming a translucent coating layer is preferably from 0.5 to 10 parts by mass, and more preferably from 1 to 5 parts by mass, with respect to 100 parts by mass of the core/shell semiconductor nanoparticle. When the use amount is within this range, the above translucent coating layer having a desired film thickness can be obtained.

When a polymer compound having a silazane bond (polysilazane) is used as the material for forming a translucent coating layer, it is preferable to form a coating layer on a core/shell semiconductor nanoparticle using a polymer compound having a silazane bond (polysilazane) and to further modify the coating layer to form a translucent coating layer. The modification means reaction to convert a part or the whole of polysilazane contained in the coating layer into silicon oxide, silicon nitride, silicon oxynitride, or the like, as described above. The modification is performed, for example, by at least one of heat treatment, ultraviolet ray irradiation treatment, and plasma treatment. The ultraviolet ray irradiation treatment which is a preferable modification treatment will be described below.

Here, "ultraviolet ray" generally means electromagnetic wave having a wavelength of 10 to 400 nm. However, a vacuum ultraviolet ray having a wavelength of 10 to 200 nm is preferably used from a viewpoint of efficient modification.

Examples of a means for generating such ultraviolet ray include a metal halide lamp, a high pressure mercury lamp, a low pressure mercury lamp, a xenon arc lamp, a carbon arc lamp, an excimer lamp (a single wavelength of 172 nm, 222 nm, or 308 nm, manufactured by USHIO Inc. and M.D.COM. inc., for example), and a UV light laser, although not limited thereto.

Hereinafter, vacuum ultraviolet ray irradiation treatment (excimer irradiation treatment) as the most preferable modification in a method for manufacturing the semiconductor nanoparticle assembly according to the present embodiment will be described in detail.

(Vacuum Ultraviolet Ray Irradiation Treatment: Excimer Irradiation Treatment)

Polysilazane is directly oxidized not via silanol by irradiation with a vacuum ultraviolet ray (action of photons called photon process). Therefore, a dense translucent coating layer containing silicon oxide, silicon nitride, silicon oxynitride, or the like, having a small volume change in the oxidation process and having a high density and less defects can be obtained. Therefore, a translucent coating layer obtained by modifying polysilazane by the vacuum ultraviolet ray irradiation treatment may have high oxygen barrier property. Vacuum ultraviolet ray irradiation may be performed at any time after the translucent coating layer is formed.

As a light source of vacuum ultraviolet ray, a rare gas excimer lamp such as of Xe, Kr, Ar, or Ne is preferably used. Among these lumps, a Xe excimer lamp emits an ultraviolet ray having a short wavelength of 172 nm at a single wavelength, and therefore has excellent luminous efficiency. This light has a large absorption coefficient of oxygen, and therefore can generate a radical oxygen atomic species or ozone at a high concentration with a small amount of oxygen. In addition, it is known that energy of light having a short wavelength of 172 nm has high ability to dissociate bonding of an organic substance. Modification of polysilazane can be realized in a short time due to the high energy by the active oxygen or ozone, and the ultraviolet ray radiation.

In vacuum ultraviolet ray irradiation, irradiation intensity of a light source used is preferably from 0.01 to 2.0 mW/cm$^2$, and more preferably from 0.1 to 1.0 mW/cm$^2$. Modification efficiency could be increased sufficiently when the intensity is within this range.

An irradiation energy amount (cumulative amount) of vacuum ultraviolet ray is preferably from 0.1 to 2000 J/cm$^2$, and more preferably from 1.0 to 1000 J/cm$^2$. Modification could be performed efficiently when the energy amount is within this range.

An atmosphere during ultraviolet ray irradiation is not particularly limited, and examples thereof include an inert gas atmosphere. When a core/shell semiconductor nanoparticle and polysilazane are stirred and mixed in a solvent, the polysilazane can be simultaneously modified by irradiation with an ultraviolet ray.

A coated semiconductor nanoparticle obtained as described above may contain another component such as a stabilizer, a surfactant, a solvent, or a catalyst usable in synthesis process as long as the coated semiconductor nanoparticle does not impair a function as a phosphor.

[Semiconductor Nanoparticle Assembly]

The semiconductor nanoparticle assembly according to the present embodiment is a particle containing an aggregate obtained which comprises a plurality of the coated semiconductor nanoparticles aggregated in a form that the coated semiconductor nanoparticles are in contact with one another. This semiconductor nanoparticle assembly acts as a phosphor.

The coated semiconductor nanoparticles which constitutes the semiconductor nanoparticle assembly may be used singly or in combination of two or more different kinds thereof. Here, it is assumed that every combination of two or more kinds of coated semiconductor nanoparticles in which at least one of a material for forming a core portion, a particle size of a core portion, a material for forming a shell portion, a thickness of a shell portion, a particle size of a core/shell semiconductor nanoparticle, a material for forming a translucent coating layer, and a thickness of the translucent coating layer is different is included in the semiconductor nanoparticle assembly according to the present embodiment in which two or more different kinds of coated semiconductor nanoparticles are combined.

The semiconductor nanoparticle assembly according to the present embodiment may be an assembly which contains an aggregate in which a plurality of coated semiconductor nanoparticles are aggregated to one another by themselves, but is preferably an assembly which contains an aggregate in which a plurality of coated semiconductor nanoparticles are aggregated to one another through a matrix from a viewpoint of strengthened aggregation between the coated semiconductor nanoparticles in the semiconductor nanoparticle assembly. That is, the semiconductor nanoparticle assembly according to the present embodiment preferably further contains a matrix for coating the entire aggregate.

Here, a material used for forming a matrix is not particularly limited as long as the material can coat an aggregate of coated semiconductor nanoparticles, and an inorganic substance or an organic substance can be used. The material preferably contains a material containing silicon or a polymer material from a viewpoint of luminous efficiency, easy production of an aggregate, or the like.

Examples of the polymer material include an amphiphilic polymer such as polymaleic anhydride-alt-1-octadecene (maleic anhydride-1-octadecene alternating copolymer), a styrene-maleic anhydride copolymer, polylactic acid having polyethylene glycol (PEG) bonded thereto, a lactic acid-glycolic acid copolymer having PEG bonded thereto, and polyoxyethylene-polyoxypropylene; and a hydrophilic polymer such as gelatin, guar gum, carboxymethylcellulose, pectin, karaya gum, polyvinyl alcohol, polyvinyl pyrrolidone, polyacrylic acid, a styrene-acrylic acid copolymer, and a vinyl acetate copolymer. Examples of the material containing silicon include a silicon compound similar to the materials exemplified as the material for forming a translucent coating layer. These materials for forming a matrix may be used singly or in combination of two or more kinds thereof.

Among these materials for forming a matrix, polymaleic anhydride-alt-1-octadecene, polysilazane (perhydropolysilazane, organopolysilazane), tetraethoxysilane, hexamethyldisilazane, and the like are preferable.

The semiconductor nanoparticle assembly according to the present embodiment may contain another component such as a stabilizer, a surfactant, a solvent, or a catalyst usable in synthesis process as long as the semiconductor nanoparticle assembly does not impair a function as a phosphor.

[Method for Manufacturing Semiconductor Nanoparticle Assembly]

The semiconductor nanoparticle assembly according to the present embodiment can be obtained by aggregating a plurality of the coated semiconductor nanoparticles by an appropriate method to form an aggregate. That is, a method for manufacturing the semiconductor nanoparticle according to the present embodiment preferably comprises a step of coating a semiconductor nanoparticle having a core/shell structure with a translucent coating layer having a thickness of 3 nm or more and 15 nm or less to manufacture a coated semiconductor nanoparticle, and a step of aggregating a plurality of the coated semiconductor nanoparticles to manufacture an aggregate.

The aggregate in which a plurality of semiconductor nanoparticles are in contact with one another, manufactured by the manufacturing method according to the present embodiment, may be used as it is as a semiconductor nanoparticle assembly without forming a matrix. However, it is preferable to further form a matrix for coating the entire aggregate by a method such as a liquid phase method after the aggregate is manufactured by aggregating a plurality of coated semiconductor nanoparticles from a viewpoint of obtaining a stronger assembly.

The step of coating a semiconductor nanoparticle having a core/shell structure with a translucent coating layer having a thickness of 3 nm or more and 15 nm or less to manufacture a coated semiconductor nanoparticle has been described in detail in the above section of the translucent coating layer, and therefore description thereof will be omitted.

A method for manufacturing an assembly by aggregating coated semiconductor nanoparticles without forming a matrix is not particularly limited, but examples thereof include a method which comprises stirring and mixing the coated semiconductor nanoparticles in a poor solvent which does not dissolve the coated semiconductor nanoparticles. Examples of the poor solvent include alcohols (methanol, ethanol, propanol, or the like) and ketones (acetone, methyl ethyl ketone, or the like). A temperature during the mixing is preferably from 20 to 80° C., and a mixing time is preferably from 10 to 40 hours.

Examples of a method for manufacturing an aggregate by forming a matrix and aggregating coated semiconductor nanoparticles include a method which comprises reacting coated semiconductor nanoparticles with a material for forming a matrix in a solvent.

Examples of the solvent which can be used include water, a hydrocarbon solvent such as aliphatic hydrocarbon, alicyclic hydrocarbon, aromatic hydrocarbon, and halogenated hydrocarbon; an ether solvent such as aliphatic ether and alicyclic ether; and a polar solvent. More specifically, examples of the hydrocarbon solvent include pentane, hexane, cyclohexane, toluene, xylene, Solvesso, terpene, methylene chloride, and trichloroethane. Examples of the ether solvent include dibutyl ether, dioxane, and tetrahydrofuran (THF). Examples of the polar solvent include N,N-dimethylformamide (DMF) and dimethyl sulfoxide (DMSO). These solvents can be used singly or in combination of two or more kinds thereof.

A use amount of the material for forming a matrix is preferably from 0.5 to 10 parts by mass with respect to 100 parts by mass of coated semiconductor nanoparticles. A reaction temperature is not particularly limited, but is preferably from 20 to 80° C., and more preferably from 25 to 40° C. Reaction time is not particularly limited, but is preferably from 1 to 300 hours, and more preferably from 10 to 200 hours.

In addition, a surfactant such as polyoxyethylene nonyl ethyl ether, a catalyst for hydrolyzing a material for forming a matrix, such as ammonia, or the like may be added to a reaction system, if necessary.

When polysilazane is used as the material for forming a matrix, the polysilazane is further modified to obtain a matrix.

As conditions for modifying polysilazane in matrix formation, conditions similar to the conditions described in the above section of the translucent coating layer can be applied. That is, for example, in the case of irradiation with a vacuum ultraviolet ray, an irradiation intensity of a light source used is preferably from 0.01 to 2.0 mW/cm$^2$, and more preferably from 0.1 to 1.0 mW/cm$^2$. Modification efficiency could be increased sufficiently when the intensity is within this range. An irradiation energy amount (cumulative amount) of the vacuum ultraviolet ray is preferably from 0.1 to 2000 J/cm$^2$, and more preferably from 1.0 to 1000 J/cm$^2$. Modification could be performed efficiently when the energy amount is within this range.

An average volume particle size of the semiconductor nanoparticle assembly is preferably from 50 to 1500 nm, more preferably from 70 to 1300 nm, and still more preferably from 100 to 1000 nm. Luminous efficiency can be further improved when the average volume particle size is within this range. The average volume particle size can be controlled by controlling mixing (reaction) time for assembling coated semiconductor nanoparticles, an addition amount of a material for forming a matrix with respect to the coated semiconductor nanoparticles, a mixing ratio of a surfactant or the like, a concentration of the coated semiconductor nanoparticles in a reaction liquid, and the like. The average volume particle size can be measured by a method in conformity with a method for measuring an average volume particle size of a semiconductor nanoparticle.

[Application]

The semiconductor nanoparticle assembly according to the present embodiment can be used suitably for a material for forming a wavelength conversion layer included in a wavelength conversion element provided in a solar cell, a back light for a liquid crystal display device, a color wheel, a white LED, optical communication, or the like; a sealing material of a light-emitting device; a photoelectric conversion material, and the like, for example.

The semiconductor nanoparticle assembly according to the present embodiment preferably comprises a matrix for aggregating coated semiconductor nanoparticles more strongly. However, with or without the matrix, the semiconductor nanoparticle assembly according to the present embodiment can be easily processed into a film shape or a sheet shape by being mixed with a resin binder or the like, and can be used suitably in various fields other than the above applications.

Examples of a method for processing the semiconductor nanoparticle assembly into a film shape or a sheet shape include a method which comprises dispersing the semiconductor nanoparticle assemblies in a resin binder such as an ultraviolet curable resin or a thermosetting resin, applying the dispersion on a substrate, and drying the assemblies, if necessary, and a method which comprises directly dispersing semiconductor nanoparticle assemblies in a substrate material, and forming a film.

As the substrate, a translucent material is used. Preferable examples of a material thereof include glass, quartz, and a resin film. A resin film capable of imparting flexibility to a film or a sheet is particularly preferable.

Examples of the resin film include a film containing a resin such as a polyester including polyethylene terephthalate (PET) and polyethylene naphthalate (PEN), polyethylene, polypropylene, a cellulose ester and a derivative thereof including cellophane, cellulose diacetate, cellulose triacetate (TAC), cellulose acetate butyrate, cellulose acetate propionate (CAP), cellulose acetate phthalate, and cellulose nitrate, polyvinylidene chloride, polyvinyl alcohol, polyethylene vinyl alcohol (ethylene-vinyl alcohol copolymer), syndiotactic polystyrene, polycarbonate, a norbornene resin, polymethyl pentene, polyether ketone, polyimide, polyether sulfone (PES), polyphenylene sulfide, polysulfone, polyether imide, polyether ketone imide, polyamide, a fluorocarbon resin, nylon (registered trademark), polymethyl methacrylate, an acrylic resin or polyacrylate, and a cyclo olefin resin film such as Arton (registered trademark, manufactured by JSR Corporation) or APEL (registered trademark, manufactured by Mitsui Chemicals, Inc.).

EXAMPLES

Hereinafter, specific Examples and Comparative Examples will be described. However, a technical scope of the present invention is not limited only to the following Examples. In the following operations, unless otherwise specified, operations and measurement of physical properties and the like are performed under conditions of room temperature (20 to 25° C.)/relative humidity 40 to 50% RH.

<Synthesis of Core/Shell Semiconductor Nanoparticle>
[Synthesis of CdSe/ZnS Core/Shell Semiconductor Nanoparticle (QD1)]

To 7.5 g of tri-n-octyl phosphine oxide (TOPO), 2.9 g of stearic acid, 620 mg of n-tetradecylphosphonic acid, and 250 mg of cadmium chloride were added under a stream of Ar, and heated to 370° C. to be mixed. The resulting mixture was cooled to 270° C., and then a solution obtained by dissolving 200 mg of selenium in 5 ml of tributylphosphine was added thereto, to obtain a CdSe mixed solution.

Subsequently, the resulting CdSe mixed solution was cooled to 80° C., and then a solution of zinc stearate and sulfur in 1 ml of trioctyl phosphine was added to the mixed solution such that a molar ratio of Cd/Se/Zn/S was 1/1/1/1. A temperature thereof was raised from 80° C. to 230° C., and reacted for 30 minutes, to obtain a CdSe/ZnS core/shell semiconductor nanoparticle (QD1, average volume particle size: 5 nm).

Acetone as a poor solvent was added to the CdSe/ZnS core/shell semiconductor nanoparticle (QD1) mixed solution to generate a precipitate. A supernatant was removed, and the precipitate was dried under reduced pressure. Thereafter, the precipitate was dispersed in toluene, to obtain a toluene dispersion of QD1 (concentration: 1 g/L).

[Synthesis of InP/ZnS Core/Shell Semiconductor Nanoparticle (QD2)]

To 6 g of octadecene, a solution of In(acac)$_3$ and tris(trimethylsilyl) phosphine in 1 g of octadecene was added such that a molar ratio of In/P was 1/1, and reacted at 300° C. for one hour under a stream of Ar, to obtain an InP mixture solution.

The resulting InP mixed solution was cooled to 80° C., and then a solution of zinc stearate and sulfur in 1 ml of octadecene was added to the mixed solution such that a molar ratio of In/P/Zn/S was 1/1/1/1. A temperature thereof was raised from 80° C. to 230° C., and reacted for 30 minutes, to obtain an InP/ZnS core/shell semiconductor nanoparticle (QD2, average volume particle size: 5.5 nm).

Acetone as a poor solvent was added to the InP/ZnS core/shell semiconductor nanoparticle mixed solution to generate a precipitate. A supernatant was removed, and the precipitate was dried under reduced pressure. Thereafter, the precipitate was dispersed in toluene, to obtain a toluene dispersion of QD2 (concentration: 1 g/L).

[Coating 1 of Semiconductor Nanoparticle (Coating 1)]

To the 0.3 mL toluene solution of QD1 obtained above, 1.5 µl (1.41 µg) of tetraethoxysilane (TEOS) was added, and the resulting mixture was stirred at room temperature (25° C.) for 20 hours, to obtain a mixed solution. Separately, 1 g of Igepal (registered trademark) CO-520 (polyoxyethylene nonyl ether) as a surfactant and 10 ml of cyclohexane were mixed, and stirred until becoming clear. To this mixed solution, the above toluene mixed solution of QD1 and TEOS was added, 80 µl of a 28% by mass ammonia solution was further added, and then 3 µl (2.82 µg) of TEOS was additionally added. Stirring and reaction were performed for a reaction time described in Table 1 (reaction temperature: 25° C.). After completion of the reaction, solid-liquid separation by centrifugation was performed. Washing and separation by centrifugation were repeated three times, and then the resulting product was dispersed in acetonitrile, to obtain an acetonitrile dispersion of a coated semiconductor nanoparticle. The coating method according to this method is also referred to as "coating 1".

[Coating 2 of Semiconductor Nanoparticle (Coating 2)]

To the 0.3 mL toluene solution of QD1 (or QD2) obtained above, 1.5 µl (1.41 µg) of TEOS was added, and the resulting mixture was stirred at 25° C. for 20 hours, to obtain a mixed solution. Separately, 1 g of Igepal (registered trademark) CO-520 (polyoxyethylene nonyl ether) as a surfactant and 10 ml of cyclohexane were mixed, and stirred until becoming clear. To this mixed solution, the above toluene mixed solution of QD1 (or QD2) and TEOS was added, 80 µl of a 28% by mass ammonia solution was further added, and then 3 µl of perhydropolysilazane (PHPS) was added. Stirring and reaction were performed for a reaction time described in Table (reaction temperature: 25° C.) while the solution was irradiated with an ultraviolet ray (wavelength: 172 nm) (irradiation intensity: 0.2 mW/cm$^2$). After completion of the reaction, washing and solid-liquid separation by centrifugation were performed in a similar manner to coating 1. The resulting product was dispersed in acetonitrile, to obtain an acetonitrile dispersion of a coated semiconductor nanoparticle. The coating method according to this method is also referred to as "coating 2".

[Synthesis 1 of Coated Semiconductor Nanoparticle Assembly (Synthesis 1)]

To the acetonitrile dispersion of a coated semiconductor nanoparticle obtained above, 0.5 g of Igepal (registered trademark) CO-520 was added, and the resulting mixture was stirred. Thereafter, 20 µl of a 28% by mass ammonia aqueous solution and 2 µl of TEOS were added thereto. Stirring and reaction were performed at 25° C. for a reaction time described in Table 1 or 2. After completion of the reaction, solid-liquid separation by centrifugation was performed, to obtain a coated semiconductor nanoparticle assembly. The assembling method according to this method is also referred to as "synthesis 1".

[Synthesis 2 of Coated Semiconductor Nanoparticle Assembly (Synthesis 2)]

To the coated semiconductor nanoparticle, 0.5 g of Igepal (registered trademark) CO-520 was added, and the resulting mixture was stirred. Thereafter, 20 µl of a 28% by mass ammonia aqueous solution and 2 µl of PHPS were added thereto. Stirring and reaction were performed for a reaction time described in Table 1 or 2 while the solution was irradiated with an ultraviolet ray (wavelength: 172 nm) (irradiation intensity: 0.2 mW/cm$^2$). After completion of the reaction, solid-liquid separation by centrifugation was performed, to obtain a coated semiconductor nanoparticle assembly. The assembling method according to this method is also referred to as "synthesis 2".

[Synthesis 3 of Coated Semiconductor Nanoparticle Assembly (Synthesis 3)]

The coated semiconductor nanoparticles were subjected to solid-liquid separation with a centrifugal machine at 22,000 rotation for 30 minutes, and then added to a mixed solvent of THF:DMF=80:20 (mass ratio) in which poly (maleic anhydride-alt-1-octadecene) (PMAO) as an amphiphilic polymer was dispersed. DMF was additionally added thereto while being stirred such that a DMF concentration became 35% by mass (concentration of coated semiconductor nanoparticle: 0.2% by mass). Stirring and reaction were performed at 25° C. for a reaction time described in Table 1 or 2. After completion of the reaction, solid-liquid separation by centrifugation was performed, to obtain a coated semiconductor nanoparticle assembly. The assembling method according to this method is also referred to as "synthesis 3".

Examples 1 to 21: Comparative Examples 1 to 20

A coated semiconductor nanoparticle and a semiconductor nanoparticle assembly were synthesized under conditions described in the following Tables 1 and 2.

In the following Tables 1 and 2, a semiconductor nanoparticle indicating "–" in the column of "coating method" means that the semiconductor nanoparticle does not have a translucent coating layer formed. A semiconductor nanoparticle indicating "–" in the column of "assembling method" means that the semiconductor nanoparticles are not aggregated. A semiconductor nanoparticle indicating "–" in the column of "accumulated irradiation amount of ultraviolet ray (J/cm$^2$) in "assembling" means that the semiconductor nanoparticle is not subjected to ultraviolet ray irradiation treatment at the time of assembling.

Comparative Example 21: Manufacturing of Optical Film 1

5.0 mg of No. 1 semiconductor nanoparticles in Table 1 were dispersed in a toluene solvent. Thereafter, an epoxy resin (trade name: Beam Set 411, manufactured by Arakawa Chemical Industries, Ltd.) was added thereto, to prepare a coating solution 1 for forming an optical layer in which the content of the semiconductor nanoparticles was 1% by mass (with respect to solid).

The coating solution 1 for forming an optical layer was applied on a cellulose triacetate (TAC) film having a thickness of 125 μm, both surfaces of which had been subjected to easy adhesion processing, so as to have a dry film thickness of 100 μm by a bar coating method. The resulting product was dried at 60° C. for three minutes, to obtain an optical film 1 in which the semiconductor nanoparticles were coated on the TAC film.

Comparative Example 22: Manufacturing of Optical Film 2

An optical film 2 in which No. 12 coated semiconductor nanoparticles were coated on a TAC film was manufactured in a similar manner to the optical film 1 except that the No. 1 semiconductor nanoparticles were changed to No. 12 coated semiconductor nanoparticles in Table 1.

Example 22: Manufacturing of Optical Film 3

An optical film 3 in which No. 14 coated semiconductor nanoparticle assembly was coated on a TAC film was manufactured in a similar manner to the optical film 1 except that the No. 1 semiconductor nanoparticles were changed to No. 14 coated semiconductor nanoparticles assembly in Table 1.

Comparative Example 23: Manufacturing of Optical Film 4

No. 1 semiconductor nanoparticles in Table 1 dispersed in methanol were added to a resin solution obtained by dissolving a cellulose triacetate (TAC) resin in a dichloromethane solvent at a concentration of about 18% by mass, and the resulting mixture was stirred sufficiently. At this time, the content of the semiconductor nanoparticles was adjusted so as to be 1% by mass (with respect to solid).

The solution was stirred for one hour, and then a film was formed so as to have a dry film thickness of 100 μm, to manufacture an optical film 4 containing semiconductor nanoparticles in a TAC film.

Comparative Example 24: Manufacturing of Optical Film 5

An optical film 5 containing No. 12 coated semiconductor nanoparticles in a TAC film was manufactured in a similar manner to the optical film 4 except that the No. 1 semiconductor nanoparticles were changed to No. 12 coated semiconductor nanoparticles in Table 1.

Example 23: Manufacturing of Optical Film 6

An optical film 6 containing a No. 14 coated semiconductor nanoparticle assembly in a TAC film was manufactured in a similar manner to the optical film 4 except that the No. 1 semiconductor nanoparticles were changed to No. 14 coated semiconductor nanoparticle assembly in Table 1.

(Evaluation)

1. Measurement of Thickness of Translucent Coating Layer of Coated Semiconductor Nanoparticle The coated semiconductor nanoparticles synthesized were subjected to solid-liquid separation with a centrifugal machine at 22,000 rotation for 30 minutes, washed with ethanol three times, and finally dispersed in pure water. Transmission electron microscope images of 100 or more particles were tested for each sample, and a thickness of the translucent coating layer was measured. Tables 1 and 2 indicate a thickness obtained by averaging 100 particles arithmetically.

2. Average Volume Particle Sizes of Semiconductor Nanoparticle and Semiconductor Nanoparticle Assembly An average volume particle size of a semiconductor nanoparticle and an average volume particle size of a semiconductor nanoparticle assembly were each determined by measuring transmission electron microscope images of 100 or more particles selected randomly for each sample and taking an average value of particle sizes thereof in terms of volume.

3. Fluorescence Intensity of Semiconductor Nanoparticle Assembly

Luminous intensity was measured using a fluorescence spectrophotometer ("F-7000" manufactured by Hitachi High-Technologies Corporation). A dispersion of semiconductor nanoparticle assemblies to be measured was prepared with pure water such that the particle molar concentration was 0.01 mmol/L. At an excitation wavelength of 450 nm, fluorescence intensity of a sample was measured at a fluorescence maximum wavelength of 630 nm. Tables 1 and 2 indicate a relative value when fluorescence intensity of QD1 not coated or assembled is 100. The higher the value is, the better the fluorescence intensity (luminous efficiency) is.

4. Heat Resistance of Semiconductor Nanoparticle Assembly

A solid obtained by subjecting each of samples to solid-liquid separation was maintained at 150° C. for two hours, and then preparation was performed with pure water such that the particle molar concentration was 0.01 mmol/L. After the preparation, fluorescence intensity was measured in a similar manner to the above section 3. Tables 1 and 2 indicate a reduction ratio of fluorescence intensity (unit: %) with respect to the fluorescence intensity measured in the above section 3. The smaller the value is, the better the heat resistance is.

5. Oxidation Resistance of Semiconductor Nanoparticle Assembly

A solid obtained by subjecting each of samples to solid-liquid separation was maintained in an atmosphere of oxygen for one week, and then preparation was performed with pure water such that the particle molar concentration was 0.01 mmol/L. After the preparation, fluorescence intensity was measured in a similar manner to the above section 3. Tables 1 and 2 indicate a reduction ratio of fluorescence intensity (unit: %) with respect to the fluorescence intensity measured in the above section 3. The smaller the value is, the better the oxidation resistance is.

6. Fluorescence Intensity of Optical Film

The optical films 1 to 6 manufactured above was measured for fluorescence intensity at a fluorescence maximum wavelength of 630 nm by direct irradiation with light having an excitation wavelength of 450 nm using a fluorescence spectrophotometer ("F-7000" manufactured by Hitachi High-Technologies Corporation). Table 3 indicates a relative value when fluorescence intensity of the optical film 1 is 100. The larger the value is, the better the fluorescence intensity (luminous efficiency) is.

7. Durability of Optical Film

The optical films 1 to 6 manufactured above were subjected to accelerated deterioration treatment in an atmosphere of 85° C. and 85% RH for 3000 hours. Thereafter, fluorescence intensity was measured in a similar manner to the above section 6, to determine a ratio of fluorescence intensity before and after the accelerated deterioration treatment. Durability of the optical films was thereby evaluated. Table 3 indicates a ratio of fluorescence intensity before and after the accelerated deterioration treatment. The larger this value is, the better the durability is. When this value is 0.80 or less, there is a practical problem.

The following Tables 1 to 3 indicate constitutions and evaluation results of Examples and Comparative Examples.

TABLE 1

| | No. | Kind of semiconductor nanoparticle | Coating method | Amount of TEOS additionally added (μl) | Reaction time (hour) | Thickness of translucent coating layer (nm) | Assembling method | Reaction time (hour) |
|---|---|---|---|---|---|---|---|---|
| Comparative Example 1 | 1 | QD1 | — | — | — | — | — | — |
| Comparative Example 2 | 2 | QD2 | — | — | — | — | — | — |
| Comparative Example 3 | 3 | QD1 | Coating 1 | 3 | 10 | 0.5 | — | — |
| Comparative Example 4 | 4 | QD1 | Coating 1 | 3 | 10 | 0.5 | Synthesis 1 | 24 |
| Comparative Example 5 | 5 | QD1 | Coating 1 | 3 | 10 | 0.5 | Synthesis 3 | 15 |
| Comparative Example 6 | 6 | QD1 | Coating 1 | 3 | 15 | 2.5 | — | — |
| Comparative Example 7 | 7 | QD1 | Coating 1 | 3 | 15 | 2.5 | Synthesis 2 | 24 |
| Comparative Example 8 | 8 | QD1 | Coating 1 | 3 | 20 | 4.5 | — | — |
| Example 1 | 9 | QD1 | Coating 1 | 3 | 20 | 4.5 | Synthesis 1 | 15 |
| Example 2 | 10 | QD1 | Coating 1 | 3 | 20 | 4.5 | Synthesis 2 | 15 |
| Example 3 | 11 | QD1 | Coating 1 | 3 | 20 | 4.5 | Synthesis 2 | 30 |
| Comparative Example 9 | 12 | QD1 | Coating 1 | 3 | 27 | 15 | — | — |
| Example 4 | 13 | QD1 | Coating 1 | 3 | 27 | 15 | Synthesis 1 | 36 |
| Example 5 | 14 | QD1 | Coating 1 | 3 | 27 | 15 | Synthesis 2 | 36 |
| Example 6 | 15 | QD1 | Coating 1 | 3 | 27 | 15 | Synthesis 2 | 36 |
| Example 7 | 16 | QD1 | Coating 1 | 3 | 27 | 15 | Synthesis 3 | 20 |
| Example 8 | 17 | QD1 | Coating 1 | 3 | 27 | 15 | Synthesis 3 | 36 |
| Comparative Example 10 | 18 | QD1 | Coating 1 | 3 | 36 | 20 | — | — |
| Comparative Example 11 | 19 | QD1 | Coating 1 | 3 | 36 | 20 | Synthesis 1 | 24 |
| Comparative Example 12 | 20 | QD1 | Coating 1 | 3 | 36 | 20 | Synthesis 2 | 36 |
| Comparative Example 13 | 21 | QD1 | Coating 1 | 3 | 36 | 20 | Synthesis 2 | 48 |

TABLE 1-continued

|  | Assembling | | Evaluation | | |
|---|---|---|---|---|---|
|  | Cumulative irradiation amount of ultraviolet ray (J/cm$^2$) | Average volume particle size (nm) | Fluorescence intensity (relative value) | Heat resistance (%) | Oxidation resistance (%) |
| Comparative Example 1 | — | 8 | 100 | 80 | 70 |
| Comparative Example 2 | — | 7.5 | 80 | 90 | 90 |
| Comparative Example 3 | — | 9 | 80 | 70 | 80 |
| Comparative Example 4 | — | 120 | 60 | 80 | 80 |
| Comparative Example 5 | — | 120 | 55 | 75 | 80 |
| Comparative Example 6 | — | 13 | 50 | 70 | 70 |
| Comparative Example 7 | 17 | 120 | 50 | 70 | 65 |
| Comparative Example 8 | — | 17 | 50 | 60 | 50 |
| Example 1 | — | 80 | 300 | 20 | 25 |
| Example 2 | 10 | 80 | 350 | 15 | 10 |
| Example 3 | 22 | 160 | 600 | 10 | 5 |
| Comparative Example 9 | — | 38 | 75 | 50 | 40 |
| Example 4 | — | 200 | 650 | 10 | 10 |
| Example 5 | 26 | 200 | 800 | 10 | 10 |
| Example 6 | 26 | 300 | 1000 | 5 | 10 |
| Example 7 | — | 150 | 400 | 10 | 5 |
| Example 8 | — | 300 | 800 | 5 | 5 |
| Comparative Example 10 | — | 48 | 50 | 45 | 45 |
| Comparative Example 11 | — | 120 | 30 | 45 | 45 |
| Comparative Example 12 | 26 | 200 | 20 | 40 | 40 |
| Comparative Example 13 | 35 | 400 | 25 | 40 | 40 |

TABLE 2

|  | No. | Kind of semiconductor nanoparticle | Coating | | | | | Assembling Assembling method |
|---|---|---|---|---|---|---|---|---|
|  |  |  | Coating method | Amount of PHPS additionally added (μl) | Reaction time (hour) | Cumulative irradiation amount of ultraviolet ray (J/cm$^2$) | Thickness of translucent coating layer (nm) |  |
| Comparative Example 14 | 22 | QD1 | Coating 2 | 3 | 10 | 7.2 | 0.5 | — |
| Comparative Example 15 | 23 | QD1 | Coating 2 | 3 | 10 | 7.2 | 0.5 | Synthesis 1 |
| Comparative Example 16 | 24 | QD1 | Coating 2 | 3 | 10 | 7.2 | 0.5 | Synthesis 2 |
| Comparative Example 17 | 25 | QD1 | Coating 2 | 3 | 20 | 14.4 | 5 | — |
| Example 9 | 26 | QD1 | Coating 2 | 3 | 20 | 14.4 | 5 | Synthesis 1 |
| Example 10 | 27 | QD1 | Coating 2 | 3 | 20 | 14.4 | 5 | Synthesis 2 |
| Example 11 | 28 | QD1 | Coating 2 | 3 | 20 | 14.4 | 5 | Synthesis 2 |
| Example 12 | 29 | QD1 | Coating 2 | 3 | 20 | 14.4 | 5 | Synthesis 2 |
| Comparative Example 18 | 30 | QD1 | Coating 2 | 3 | 40 | 28.8 | 10 | — |
| Example 13 | 31 | QD1 | Coating 2 | 3 | 40 | 28.8 | 10 | Synthesis 1 |
| Example 14 | 32 | QD1 | Coating 2 | 3 | 40 | 28.8 | 10 | Synthesis 2 |
| Example 15 | 33 | QD1 | Coating 2 | 3 | 40 | 28.8 | 10 | Synthesis 2 |
| Comparative Example 19 | 34 | QD2 | Coating 2 | 3 | 20 | 14.4 | 5 | — |
| Example 16 | 35 | QD2 | Coating 2 | 3 | 20 | 14.4 | 5 | Synthesis 2 |
| Example 17 | 36 | QD2 | Coating 2 | 3 | 20 | 14.4 | 5 | Synthesis 3 |
| Comparative Example 20 | 37 | QD2 | Coating 2 | 3 | 40 | 28.8 | 10 | — |
| Example 18 | 38 | QD2 | Coating 2 | 3 | 40 | 28.8 | 10 | Synthesis 1 |

TABLE 2-continued

| | | | | | | | | |
|---|---|---|---|---|---|---|---|---|
| Example 19 | 39 | QD2 | Coating 2 | 3 | 40 | 28.8 | 10 | Synthesis 2 |
| Example 20 | 40 | QD2 | Coating 2 | 3 | 40 | 28.8 | 10 | Synthesis 2 |
| Example 21 | 41 | QD2 | Coating 2 | 3 | 40 | 28.8 | 10 | Synthesis 3 |

| | Assembling | | | Evaluation | | |
|---|---|---|---|---|---|---|
| | Reaction time (hour) | Cumulative irradiation amount of ultraviolet ray (J/cm$^2$) | Average volume particle size (nm) | Fluorescence intensity (relative value) | Heat resistance (%) | Oxidation resistance (%) |
| Comparative Example 14 | — | — | 9 | 60 | 80 | 70 |
| Comparative Example 15 | 48 | — | 400 | 40 | 80 | 75 |
| Comparative Example 16 | 48 | 35 | 400 | 40 | 80 | 70 |
| Comparative Example 17 | — | — | 18 | 60 | 60 | 50 |
| Example 9 | 36 | — | 200 | 800 | 10 | 5 |
| Example 10 | 48 | 35 | 400 | 1000 | 5 | 5 |
| Example 11 | 100 | 72 | 800 | 1200 | 5 | 5 |
| Example 12 | 240 | 173 | 1200 | 700 | 5 | 5 |
| Comparative Example 18 | — | — | 28 | 30 | 40 | 45 |
| Example 13 | 24 | — | 150 | 1000 | 10 | 5 |
| Example 14 | 30 | 22 | 150 | 1200 | 5 | 5 |
| Example 15 | 48 | 35 | 400 | 2000 | 5 | 5 |
| Comparative Example 19 | — | — | 17.5 | 30 | 70 | 70 |
| Example 16 | 36 | 26 | 300 | 800 | 5 | 5 |
| Example 17 | 36 | — | 300 | 850 | 5 | 5 |
| Comparative Example 20 | — | — | 27.5 | 15 | 50 | 55 |
| Example 18 | 36 | — | 200 | 700 | 10 | 5 |
| Example 19 | 36 | 26 | 200 | 700 | 5 | 5 |
| Example 20 | 50 | 36 | 500 | 850 | 5 | 5 |
| Example 21 | 36 | — | 300 | 500 | 10 | 5 |

TABLE 3

| | Optical film No. | Fluorescence intensity (relative value) | Durability |
|---|---|---|---|
| Comparative Example 21 | 1 | 100 | 0.70 |
| Comparative Example 22 | 2 | 75 | 0.50 |
| Example 22 | 3 | 800 | 0.95 |
| Comparative Example 23 | 4 | 100 | 0.75 |
| Comparative Example 24 | 5 | 75 | 0.55 |
| Example 23 | 6 | 850 | 0.95 |

As clearly noted from the above Tables 1 and 2, the semiconductor nanoparticle assemblies according to Examples show excellent luminous efficiency, heat resistance, and oxidation resistance.

Also as clearly noted from Table 3, the optical films containing the semiconductor nanoparticle assemblies according to Examples show excellent fluorescence intensity and durability.

The present application is based on Japanese Patent Application No. 2014-120708 filed on Jun. 11, 2014 and Japanese Patent Application No. 2014-162642 filed on Aug. 8, 2014, disclosed contents of which are incorporated here as a whole by reference.

The invention claimed is:

1. A semiconductor nanoparticle assembly which includes an aggregate having a plurality of coated semiconductor nanoparticles aggregated, said coated semiconductor nanoparticles each containing a semiconductor nanoparticle having a core/shell structure and a translucent coating layer having a thickness of 3 nm or more and 15 nm or less for coating the semiconductor nanoparticle.

2. The semiconductor nanoparticle assembly according to claim 1, which has an average volume particle size of 100 nm to 1000 nm.

3. The semiconductor nanoparticle assembly according to claim 1, wherein the translucent coating layer contains silicon.

4. The semiconductor nanoparticle assembly according to claim 1, which further comprises a matrix for coating the aggregate entirely.

5. The semiconductor nanoparticle assembly according to claim 4, wherein the matrix contains a silicon-containing material.

6. The semiconductor nanoparticle assembly according to claim 4, wherein the matrix contains a polymer material.

7. The semiconductor nanoparticle assembly according to claim 1, wherein a thickness of the translucent coating layer is 4 nm or more and 12 nm or less.

8. A wavelength conversion element comprising a wavelength conversion layer including the semiconductor nanoparticle assembly set forth in claim 1.

9. A method for manufacturing a semiconductor nanoparticle assembly, comprising:

coating a semiconductor nanoparticle having a core/shell structure with a translucent coating layer having a thickness of 3 nm or more and 15 nm or less to manufacture a coated semiconductor nanoparticle; and aggregating a plurality of the coated semiconductor nanoparticles to manufacture an aggregate.

10. The method for manufacturing a semiconductor nanoparticle assembly according to claim 9, wherein the coated semiconductor nanoparticle is manufacture by forming the coating layer on the semiconductor nanoparticle using a polymer compound having a silazane bond, and modifying the coating layer.

11. The method for manufacturing a semiconductor nanoparticle assembly according to claim 9, further comprising coating the aggregate with a matrix.

12. The method for manufacturing a semiconductor nanoparticle assembly according to claim 11, wherein the semiconductor nanoparticle assembly having the aggregate coated with the matrix is obtained by reacting the coated semiconductor nanoparticle with a material for forming the matrix in a solvent.

* * * * *